United States Patent [19]

Farmer et al.

[11] Patent Number: 5,516,972
[45] Date of Patent: May 14, 1996

[54] MEDIATED ELECTROCHEMICAL OXIDATION OF ORGANIC WASTES WITHOUT ELECTRODE SEPARATORS

[75] Inventors: Joseph C. Farmer, Newtown, Pa.; Francis T. Wang, Danville, Calif.; Robert G. Hickman; Patricia R. Lewis, both of Livermore, Calif.

[73] Assignee: The Regents of the University of California, Oakland, Calif.

[21] Appl. No.: 933,643

[22] Filed: Aug. 24, 1992

[51] Int. Cl.$^6$ .................................. A62D 3/00
[52] U.S. Cl. .............. 588/210; 588/227; 205/464; 205/555; 205/639; 205/688
[58] Field of Search .................. 588/227, 210; 204/59 R, 103, 131, 278, 129

[56] References Cited

U.S. PATENT DOCUMENTS

| | | | |
|---|---|---|---|
| 4,268,363 | 5/1981 | Coughlin | 204/39 |
| 4,389,288 | 6/1983 | Vaughan | 204/129 |
| 4,702,804 | 10/1987 | Mazur et al. | 588/210 |
| 4,752,364 | 6/1988 | Dhooge | 204/131 |
| 4,971,666 | 11/1990 | Weinberg et al. | 204/59 |

FOREIGN PATENT DOCUMENTS

| | | | |
|---|---|---|---|
| 0297738 | 1/1989 | European Pat. Off. | |
| WO89/10981 | 11/1989 | WIPO | C22B 3/00 |

OTHER PUBLICATIONS

J. C. Farmer et al., "Destruction of Chlorinated Organics by Cobalt (III)–Mediated Electrochemical Oxidation," UCRL–JC–109633 Preprint Feb. 2, 1992.

J. C. Farmer et al., "Initial Study of the Complete Mediated Electrochemical Oxidation of Ethylene Glycol," UCRL–LR–106479, Jan. 10, 1991.

J. C. Farmer, et al., "Electrochemical Treatment of Mixed and Hazardous Wastes: Oxidation of Ethylene Glycol by Silver(II)," UCRL–JC–106947 Rev. 2, May, 1991.

J. C. Farmer, et al., "Electrochemical Treatment of Mixed and Hazardous Wastes: Oxidation of Benzene by Silver(II)." UCRL–JC–107043 Rev. 2, May, 1991.

J. C. Farmer, et al., "Initial Study of Halide–Tolerant Mediators for the Electrochemical Treatment of Mixed and Hazardous Wastes," UCRL–LT–107781, Jun. 20, 1991.

J. C. Farmer, et al., "Electrochemical Treatment of Mixed and Hazardous Wastes: Oxidation of Ethylene Glycol and Benzene by Silver(II)," UCRL–JC–107043 Rev. 3, Oct. 26, 1991.

J. C. Farmer, et al., "Electrochemical Treatment of Mixed and Hazardous Wastes: Oxidation of Ethylene Glycol by Cobalt (III) and Iron (III)." UCRL–JC–109134 Preprint Dec. 1991.

*Primary Examiner*—T. Tung
*Assistant Examiner*—C. Delacroix-Muirheid
*Attorney, Agent, or Firm*—Henry P. Sartorio

[57] ABSTRACT

An electrochemical cell/electrolyte/mediator combination for the efficient destruction of organic contaminants using metal salt mediators in a sulfuric acid electrolyte, wherein the electrodes and mediator are chosen such that hydrogen gas is produced at the cathode and no cell membrane is required.

6 Claims, 3 Drawing Sheets

MEDIATED ELECTROCHEMICAL OXIDATION OF ORGANIC WASTES WITHOUT ELECTRODE SEPARATORS

The United States Government has rights in this invention pursuant to contract W-7405-ENG-48 between the U.S. Department of Energy and the University of California Lawrence Livermore Laboratory.

FIELD OF THE INVENTION

This invention relates to apparatus and methods useful for the efficient electrochemical destruction of organic wastes in a cell configuration in which electrode separators are not required. In particular the invention relates to improved apparatus and methods especially appropriate for converting a halide containing organic component of radioactive mixed wastes to $CO_2$ without the risk of high temperature volatilization of radionuclides.

BACKGROUND OF THE INVENTION

Mediated electrochemical oxidation can be used to convert the organic components of radioactive mixed wastes to $CO_2$, without risking high-temperature volatilization of radionuclides. Typically, anodic oxidation is used to convert Ag(I) to Ag(II) in $HNO_3$. Then, Ag(II) reacts with solvent and dissolved organics to produce $CO_2$. The electrochemical cell used to generate Ag(II), or other mediators, has an electrode separator to prevent deposition of Ag metal on the cathode and the reduction of Ag(II) by the cathode or cathodically-generated species.

There are numerous problems associated with the Ag(I)–Ag(II) process. These problems include: precipitation of Ag(I) by halide anions liberated by the destruction of halogenated organics; diffusion of Ag(I), or other mediators, through the electrode separator, recovery of mediator from the catholyte, generation of $NO_x$ at the cathode, corrosion problems of anode and other cell components in $HNO_3/HCl$ solutions, leakage of separator seals, separator fouling, and separator rupture.

Accordingly, it is the object of the present invention to provide an electrochemical cell and method which are as simple as possible, but which nevertheless overcome as many of the aforementioned problems as possible.

SUMMARY OF THE INVENTION

The present invention is an electrochemical cell/electrolyte/mediator combination, the cell including an anode and a cathode which are not separated by a cell membrane or divider. To allow the cell to efficiently destroy organics without the need for a cell divider, the cell is used with an acidic electrolyte and mediator combination which avoids deposition of any precipitates from solution, and promotes the formation of hydrogen gas at the cathode, thereby eliminating the possibility of reoxidizing the hydrogen at the anode. The cell of the invention includes electrically efficient electrodes such as electrodes comprising a surface layer of a catalytically active material, to ensure a low overpotential for the formation of hydrogen gas at the cathode. In its most preferred form, the invention is a cell including electrodes comprising a platinum containing surface layer, an electrolyte comprising $H_2SO_4$, and a mediator of cobalt sulfate or iron sulfate.

In the method of the invention an acidic electrolyte containing a cobalt or iron mediator and an organic for which destruction is desired are placed in an undivided cell, i.e., where no membrane or separator is used, and a potential applied across the electrodes. Where cobalt or iron mediators are used, the oxidized form of the mediator is reacted with the solvent and organic to form $CO_2$ and $H_2O$, as well the reduced form of the mediator. The mediator is then reoxidized at the anode, and the process repeated until the desired amount of organic has been destroyed.

BRIEF DESCRIPTION OF THE DRAWINGS

The present invention will be better understood by reference to the attached drawing figures of which.

DETAILED DESCRIPTION OF THE INVENTION

Figure 1:
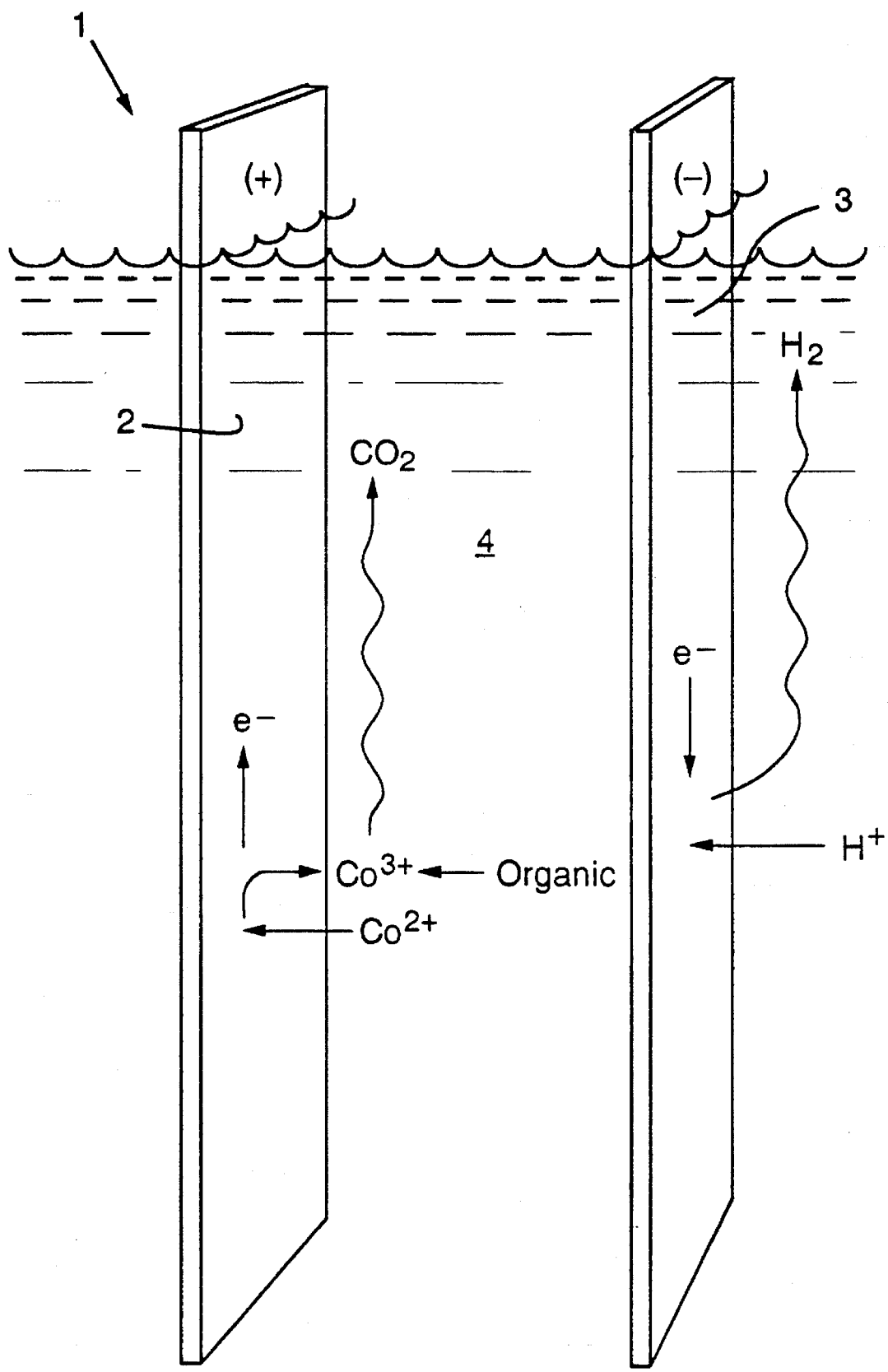
FIG. 1 depicts a first embodiment of an electrochemical cell arrangement according to the invention in which no electrode separator is necessary.

The most preferred embodiments of the invention will now be described in detail.

The present invention involves a mediated electrochemical process in a cell configuration which does not require an electrode separator such as is commonly used, e.g., Nafion brand membrane material. The process and cell of the invention solve numerous problems associated with prior art processes for the electrochemical destruction of organics, especially where the waste organic stream contains a radioactive component and the organics in question contain halides. The invention is operated without silver ions and avoids the metal plating problems of the prior art, and having to recover the silver from solution.

This process requires no electrode separator, consequently, simple, inexpensive large-scale systems can be built. Problems associated with the incorporation of electrode separators (cation and anion exchange membranes) into plate-and-frame cells are eliminated. There is no danger of membrane rupture and fouling. Leakage of membrane seals is also avoided.

According to the invention, an electrode/electrolyte/mediator combination is selected such that: (1) $H_2$ evolves from the cathode (i.e., instead of $NO_x/HNO_2$); (2) the potential for deposition of the mediator on the cathode is more cathodic than that required for $H_2$ evolution; (3) the mediator is oxidized at the anode at less anodic potentials than those required for $O_2$ evolution; and (4) the oxidized form of the mediator is sufficiently oxidizing to readily convert dissolved organics into $CO_2$, and other reaction products which are preferably soluble in the electrolyte.

Falling within these requirements is a process for mediated electrochemical oxidation using an electrolyte of $H_2SO_4$ including a mediator formed from $CoSO_4$. At the anode, Co(II) is converted to Co(III) by anodic oxidation. Co(III) reacts with the solvent and dissolved organics in a thin layer of electrolyte at the anode surface to produce $CO_2$. Since Co(III) is reduced so close to the anode, a membrane is not needed to prevent its migration to the cathode. At the cathode, H⁺ is reduced to produce gaseous $H_2$. No Co metal is deposited on the cathode and no $NO_x$ is generated. Co(II) forms soluble halide salts, so precipitation problems are avoided. Corrosion problems in $H_2SO_4$/HCl are less severe than those in $HNO_3$/HCl.

The important features of the invention allow elimination of the electrode separator. These are, first, dissolved organics reduce $Co^{3+}$ in close proximity to the anode. Since the $Co^{3+}$ never reaches the cathode, the back reaction (reduction to $Co^{2+}$) never occurs.

Second, the cathode is depolarized by an electrochemical reaction that occurs at less cathodic potentials than the reduction of $Co^{2+}$, result in the electrodeposition of metallic cobalt on the cathode. In this case, hydrogen evolution occurs preferentially, so the electrodeposition of cobalt or iron is prevented. Thus, the cell does not require a membrane to prevent $Co^{2+}$ from reaching the cathode.

Figure 2:
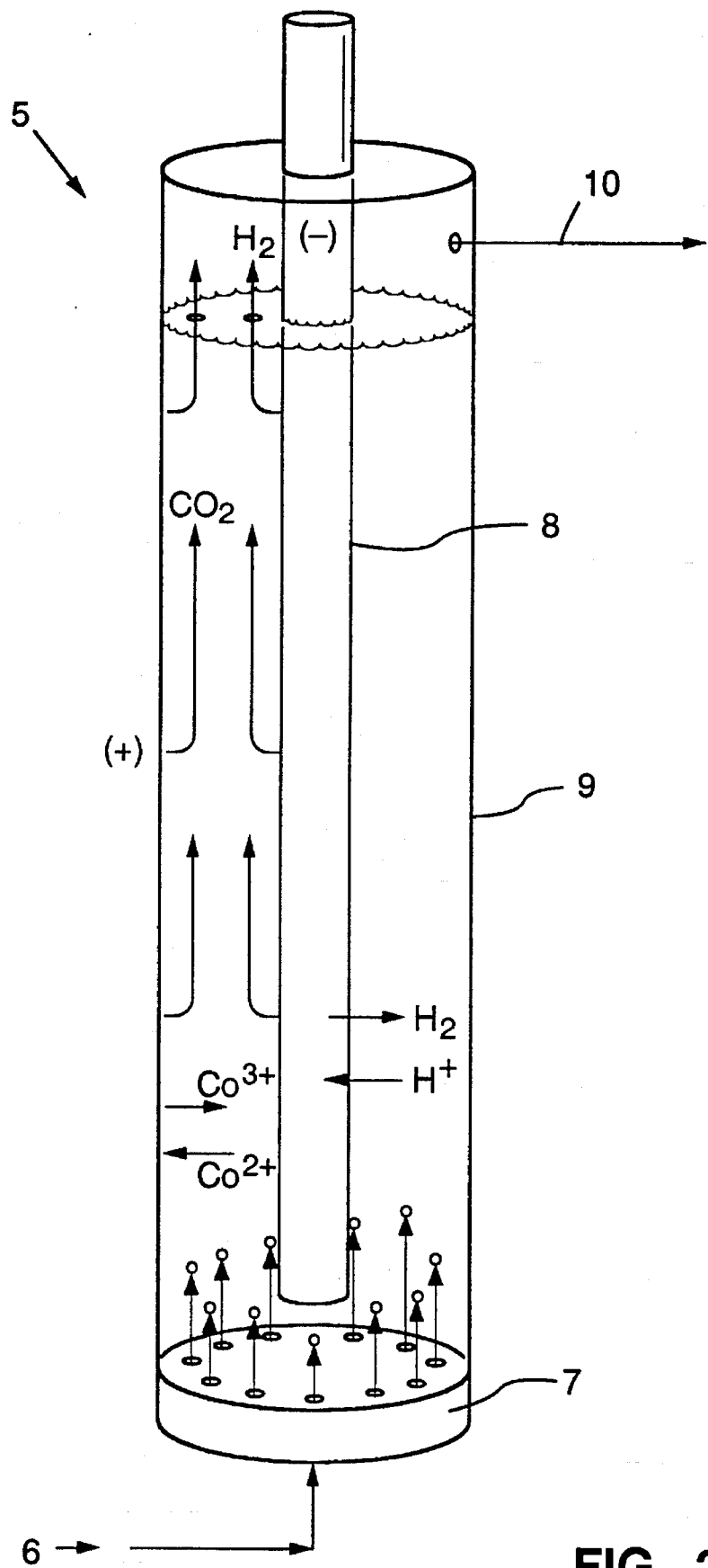
FIG. 2 depicts a second embodiment of an electrochemical cell arrangement according to the invention in which organic contaminated air can be treated.

Two possible configurations of the cell arrangement of the invention are shown in FIGS. 1 and 2. FIG. 1 shows the invention in its simplest form, and utilizing the preferred $CoSO_4$/$H_2SO_4$ electrolyte.

In FIG. 1 the cell and electrolyte arrangement 1 is shown. The cell is made up of anode 2 and cathode 3 submersed in electrolyte 4. When the cell is operated by the application of a potential across the electrodes, $CO_2$ from decomposing organics is formed as the organics are oxidized in the electrolyte, near the anode. Hydrogen gas is formed at the cathode.

In regard to electrolytes, we have used a wide variety of metal nitrate and metal sulfate salts in nitric and sulfuric acids, respectively. We have found that the use of metal sulfate salts in $H_2SO_4$ avoids cathodic generation of $NO_x$ encountered in electrolytes made of $HNO_3$. In particular, we have found that electrolytes composed of $CoSO_4$ in $H_2SO_4$ require no electrode separators, whereas one experiences some deposition of cobalt and generation of $NO_x$ in systems based on $HNO_3$. As shown in FIG. 1, at the anode, $Co^{2+}$ is converted to $Co^{3+}$ (known as an oxidizer or mediator).

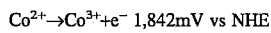
$Co^{2+} \rightarrow Co^{3+} + e^-$ 1,842mV vs NHE

Dissolved organic wastes reduce $Co^{3+}$ in close proximity to the anode, so $Co^{3+}$ never reaches the cathode.

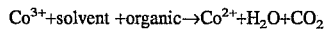
$Co^{3+} + solvent + organic \rightarrow Co^{2+} + H_2O + CO_2$

Furthermore, $Co^{2+}$ is not electroplated as metallic cobalt on the cathode. The cathodic reaction is reduction of H⁺ (hydrogen evolution) and is dictated by $H_2SO_4$ electrolyte, not the cathode material.

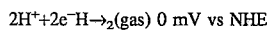
$2H^+ + 2e^- \rightarrow H_2$(gas) 0 mV vs NHE

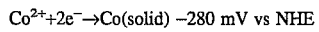
$Co^{2+} + 2e^- \rightarrow Co$(solid) −280 mV vs NHE

We have found that iron also meets the requirements for mediators which can be used in the invention, undergoing the reaction:

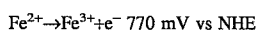
$Fe^{2+} \rightarrow Fe^{3+} + e^-$ 770 mV vs NHE

Note that depolarization of the cathode with hydrogen evolution, or a similar reaction, also precludes the electrodeposition of iron.

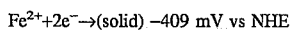
$Fe^{2+} + 2e^- \rightarrow$ (solid) −409 mV vs NHE

The reduction of $Fe^{2+}$ to metallic iron also occurs at more cathodic potentials than hydrogen evolution.

Platinum is preferably used as the cathode material in the present invention because it presents a low overpotential for hydrogen gas formation. However, those skilled in the art will recognize that many other known materials and catalytically active coatings such as gold, steel, titanium, niobium, iridium, alloys of iridium, graphite and tin oxide can also be used.

While in this preferred embodiment we have identified the use of platinum electrodes in combination with sulfuric acid mediator and cobalt and iron mediator couples, those skilled in the art will recognize that other cathodic reactions can be used to eliminate the need for an electrode separator in the process. In general, the electrode materials, electrolyte and mediator will be chosen such that the desired cathodic reaction must occur at less cathodic potential than reduction reactions involving the dissolved metal salt, such as electrodeposition. Furthermore, the species involved in the cathodic reaction cannot compete with dissolved organics for available oxidant at the anode surface.

FIG. 2 depicts a cell configuration through which air contaminated with halide containing organics can be bubbled. In this configuration, air containing such organic waste is fed via inlet stream 6 through distributor 7, at the bottom of the "scrubber"/cell assembly 5. Since no electrode separating membrane is required a simple cylinder in tube arrangement can be used so that cylindrical-shaped cathode 8 is disposed along the approximate center line defined by cylindrically shaped anode 9. As bubbles progress through the $CoSO_4$/$H_2SO_4$ electrolyte within the cell, waste organics are dissolved in the electrolyte and react with $Co^{3+}$ to form $CO_2$. HCl will also be formed in the electrolyte during the destruction of halogenated organics. Along with the $CO_2$, $H_2$ formed at the cathode bubbles to the top of the cell and exits via exit stream 10 from cell 5, the organics having been removed.

Those skilled in the art will recognize that in all cases the apparatus used to carry out the invention will include means for applying a potential across the electrodes used in the cell, though such is not shown in the figures.

Note that hydrogen gas is easily separated from the electrolyte and can be used to feed a fuel cell, or some other power generating device. Consequently, much of the electrical power consumed by the waste treatment process can be reclaimed as electrical power. In fact, one might use this process to produce hydrogen fuel electrolytically. If the objective of this process is hydrogen fuel production, the primary advantage over conventional technology is that the cell voltage is diminished by depolarization of the anode with oxidation of $Co^{2+}$, instead of oxygen evolution. In a normal electrolysis cell, the anodic reaction is

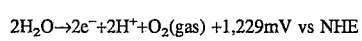
$2H_2O \rightarrow 2e^- + 2H^+ + O_2$(gas) +1,229mV vs NHE where as in the process of the present invention one would oxidize iron via

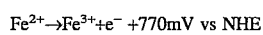
$Fe^{2+} \rightarrow Fe^{3+} + e^-$ +770mV vs NHE

Thus, 459 mV of cell polarization, which translates directly into electrical power, is saved in a system that requires no electrode separator.

Figure 3:
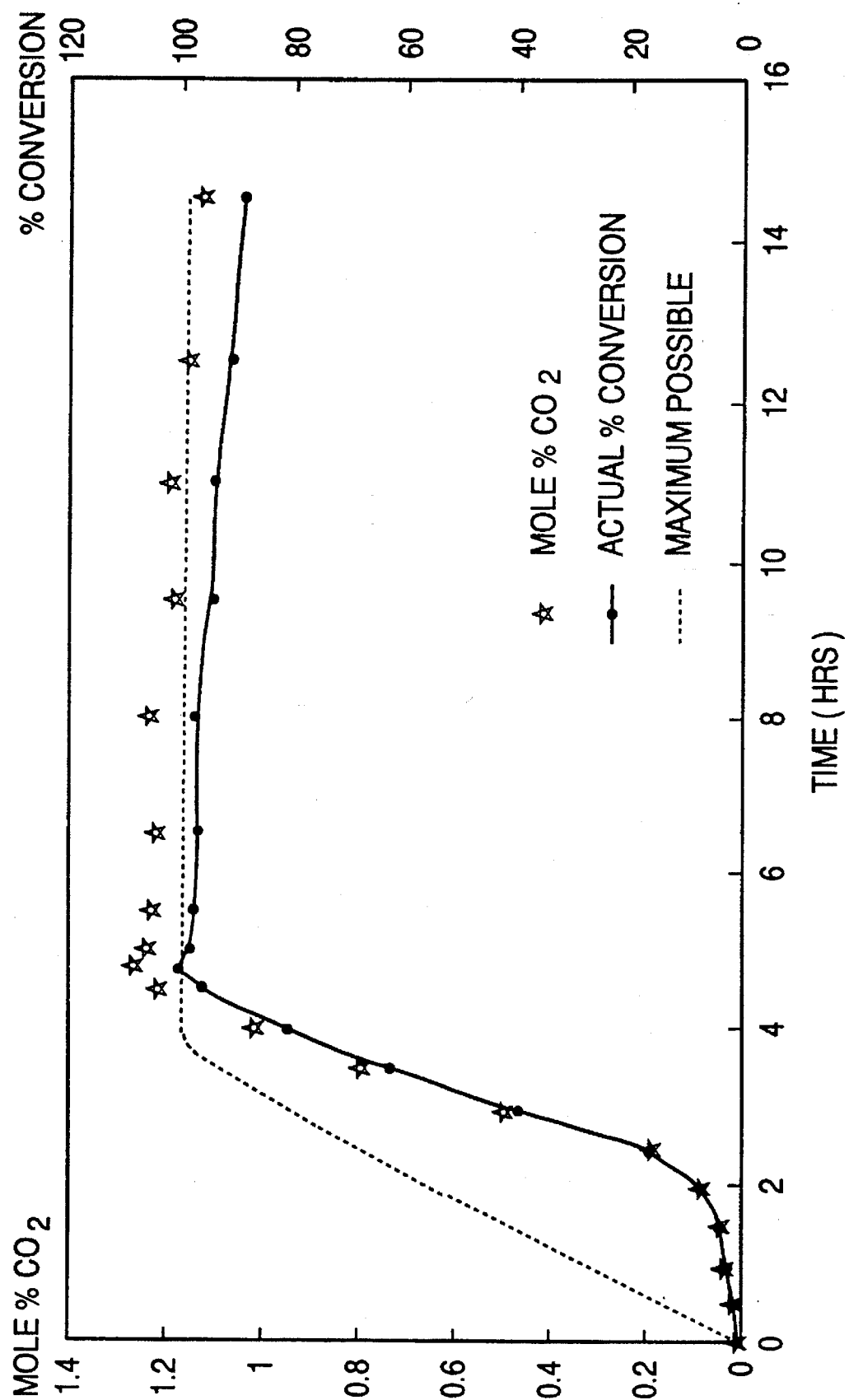
FIG. 3 is a graph showing the experimental results obtained using a cell configuration having no electrode separator.

FIG. 3 shows data collected where a cell according to the invention was operated. The cell used to generate the data of FIG. 3 was a rotating cell. The electrolyte/mediator used was 80 mls of 0.5 molar $CoSO_4$/1.63 molar $H_2SO_4$, and also included 0.11 molar ethylene glycol. A current of 673 mA was applied using a platinum rotating-cylinder anode (rotating at 1500 rpm) and a stationary platinum cathode, with no cell membrane dividing anode and cathode. The cylindrical anode was 1.2 cm in diameter and 1.78 cm in length.

As can be seen in the FIG. 3, even though no electrode separator was used, highly efficient conversion of the ethylene glycol to $CO_2$ took place over the course of the experiment.

Tables 1 and 2 below tabulate the results of measurements of ethylene glycol (EG) conversion to $CO_2$ at 336 mA, 673 mA, and 1346 mA using the experimental cell. The Coulombic efficiency was 72–76% at 336–673 mA, but decreased to 57% at 1346 mA. All of the EG charged to the system was converted to $CO_2$ (100% conversion efficiency). In the case of EG destruction, nonlinearity observed in the conversion-time curve is assumed to be due to the sequential formation of known reaction intermediates.

Measurements of 1,3-dichloro-2-propanol (DCP) conversion to $CO_2$ were also conducted at 336 mA, 673 mA, and 1346 mA. For DCP the Coulombic efficiency was constant at 43% for all three levels of current. Approximately 80% of the DCP charged to the system was converted to $CO_2$ at 336 mA (80% conversion efficiency). The conversion efficiency increased to about 90% at 673–1346 mA. The failure to achieve 100% conversion efficiency is attributed to volatilization of DCP from the anolyte.

The same experiment was run for 3-monochloro-1-propanol (MCP). In this experiment the Coulombic efficiency was constant at 33% for all three levels of current. Approximately 70% of the MCP charged to the system was converted to $CO_2$ at 336 mA. The conversion efficiency increased to approximately 90% at 673–1346 mA. Here too the failure to achieve 100% conversion is attributed to substrate (MCP) volatilization.

The same experiment was run for isopropanol (IPA). In this experiment the Coulombic efficiency was constant at 10% for all three levels of current. IPA is much more volatile than EG, DCP and MCP. The maximum conversion efficiency was 50% at 336 mA, and increased slightly to 65% at 673–1346 mA. There was more time for evaporative loss at the lower current level.

Typical Coulombic efficiencies for EG, DCP, MCP, and IPA were 47–76%, 43% 33% and 10% respectively Very little EG was lost from the anolyte by evaporation due to its relatively low vapor pressure. Thus, high conversion efficiency was achieved. Lower conversion efficiencies for DCP, MCP and IPA are attributed to volatilization.

During the oxidation of EG, DCP, MCP and IPA by Co(III), the color of the bulk anolyte was light pink, characteristic of Co(II) solutions (peak absorbance at 513 nm). The concentration of Co(III) in the bulk anolyte was essentially zero, indicating that the organics were oxidized near the surface of the rotating cylinder anode. After complete conversion of EG to $CO_2$, the color of the bulk anolyte turned dark purple, characteristic of Co(III) solutions (peak absorbance at 342 nm).

There was no evidence of Co electrodeposition on the cathode. The cathodic reaction was the evolution of $H_2$.

TABLE 1

| Coulombic Efficiencies (%) for Mediated Electrochemical Oxidation by CO(III) in $H_2SO_4$ | | | | |
|---|---|---|---|---|
| Current (mA) | EG | DCP | MCP | IPA |
| 336 | 76 | 43 | 33 | 10 |
| 673 | 72 | 43 | 33 | 10 |

TABLE 1-continued

| Coulombic Efficiencies (%) for Mediated Electrochemical Oxidation by CO(III) in $H_2SO_4$ | | | | |
|---|---|---|---|---|
| Current (mA) | EG | DCP | MCP | IPA |
| 1346 | 47 | 43 | 33 | 10 |

TABLE 2

| Maximum Conversions (%) for Mediated Electrochemical Oxidation by CO(III) in $H_2SO_4$ | | | | |
|---|---|---|---|---|
| Current (mA) | EG | DCP | MCP | IPA |
| 336 | 100 | 80 | 70 | 50 |
| 673 | 100 | 90 | 90 | 65 |
| 1346 | 100 | 90 | 90 | 65 |

The foregoing description of the preferred embodiments of the invention is illustrative and not intended to be exhaustive. Many variations of the invention are possible in light of the present disclosure, and it is intended that such variations within the skill of those familiar with this art are included within the scope of the following claims.

What is claimed is:

1. A process for the destruction of organic containing wastes in an undivided electrochemical cell, comprising the steps of:
   (1) placing an organic containing solution in an electrochemical cell, said cell including an anode and a cathode with no cell separator therebetween, an electrolyte comprising sulfuric acid and a cobalt salt mediator, wherein said mediator, said anode and said cathode are selected such that
      (a) the potential for deposition of a solid cobalt metal on said cathode is more cathodic than that required for $H_2$ evolution,
      (b) a metal ion Co(II) of said mediator is oxidized at said anode at less anodic potentials than those required for $O_2$ evolution, and
      (c) an oxidized form of said metal ion Co(III) is sufficiently oxidizing to convert organics dissolved in said electrolyte into $CO_2$;
   (2) applying a potential across said anode and cathode so as to cause a reduced form of said mediator to become oxidized at said anode, and hydrogen gas to form at said cathode;
   (3) allowing said organic and solvent to react with said oxidized mediator to form carbon dioxide, water and a reduced form of said mediator; and
   (4) repeating steps (2) and (3) until a desired amount of organic has been destroyed.

2. A method for the destruction of organic containing wastes as claimed in claim 1 wherein said cobalt salt comprises cobalt sulfate.

3. A method for the destruction of organic containing wastes as claimed in claim 1 wherein said anode is made from a member of the group consisting of gold, platinum, steel, graphite, titanium, niobium, iridium and tin oxide.

4. A method for the destruction of organic containing wastes as claimed in claim 1 wherein said cathode is made from a member of the group consisting of gold, platinum, steel, graphite, titanium, niobium, iridium and tin oxide.

5. A process for the destruction of organic containing wastes in an undivided electrochemical cell, comprising the steps of:

(1) placing an organic containing solution in an electrochemical cell, said cell including a platinum anode and a platinum cathode with no cell separator therebetween, an electrolyte comprising sulfuric acid and a cobalt salt mediator, wherein said mediator is selected such that
   (a) the potential for deposition of solid cobalt metal on said cathode is more cathodic than that required for $H_2$ evolution,
   (b) a metal ion Co(II) of said mediator is oxidized at said anode at less anodic potentials than those required for $O_2$ evolution, and
   (c) an oxidized form of said metal ion Co(II) is sufficiently oxidizing to convert organics dissolved in said electrolyte into $CO_2$;

(2) applying a potential across said anode and cathode so as to cause a reduced form of said mediator to become oxidized at said anode, and hydrogen gas to form at said cathode;

(3) allowing said organic and solvent to react with said oxidized mediator to form carbon dioxide, water and a reduced form of said mediator; and (4) repeating steps (2) and (3) until a desired amount of organic has been destroyed.

6. A method for the destruction of organic containing wastes as claimed in claim 5 wherein said cobalt salt comprises cobalt sulfate.

* * * * *